United States Patent [19]

Hatsushi et al.

[11] 4,415,178
[45] Nov. 15, 1983

[54] SUSPENSION FOR MOTOR VEHICLES

[75] Inventors: Suehiro Hatsushi, Asaka; Tetsuro Mitsui, Niiza; Takeomi Miyoshi, Wako, all of Japan

[73] Assignee: Honda Giken Kogyo Kabushiki Kaisha, Tokyo, Japan

[21] Appl. No.: 333,986

[22] Filed: Dec. 23, 1981

[30] Foreign Application Priority Data

Dec. 26, 1980 [JP] Japan .................................. 55-186280
Jan. 6, 1981 [JP] Japan .................................. 56-478[U]
Apr. 28, 1981 [JP] Japan .......................... 56-64512[U]

[51] Int. Cl.³ .............................................. B60G 11/20
[52] U.S. Cl. ................................... 280/664; 280/695; 280/700; 280/721; 267/57
[58] Field of Search ............... 280/664, 665, 673, 695, 280/700, 721, 717; 267/25, 26, 27, 57

[56] References Cited

U.S. PATENT DOCUMENTS

| | | | |
|---|---|---|---|
| 2,845,279 | 7/1958 | Polhemus | 280/664 |
| 2,998,241 | 8/1961 | Eyb | 280/664 |
| 3,161,251 | 12/1964 | Kraus | 280/664 |
| 3,178,200 | 4/1965 | Backaitis | 280/664 |
| 3,279,556 | 10/1966 | Kozicki | 280/664 |
| 3,490,785 | 1/1970 | Moss | 280/664 |

FOREIGN PATENT DOCUMENTS

1236950 3/1967 Fed. Rep. of Germany .

Primary Examiner—Robert R. Song
Attorney, Agent, or Firm—Irving M. Weiner; Pamela S. Burt; John L. Shortley

[57] ABSTRACT

A suspension system for a motor vehicle having a body, the system including at least a pair of suspensions each comprising a shock absorber having an upper end adapted to be mounted on the body of the motor vehicle, a knuckle operatively connected to the shock absorber for supporting a wheel thereon, a radius arm adapted to be mounted at one end on the body and supporting at a distal end thereof the knuckle, a torsion bar spring having one end adapted to be fixed to the body and a twistable and flexible distal end and adapted to extend in the fore-and-aft direction of the motor vehicle, and a resilient lower arm having one end fixed to the distal end of the torsion bar spring and the other end fastened to the distal end of the radius arm, the lower arm being flexible in the fore-and-aft direction of the motor vehicle and rigid in the vertical direction thereof. The suspension system of the present invention enables the torsion bars to function effectively.

7 Claims, 16 Drawing Figures

FIG. 16 ns each comprising a shock absorber having an upper end adapted to be mounted on the body of the motor vehicle, a knuckle operatively connected to the shock absorber for supporting a wheel thereon, a radius arm adapted to be mounted at one end thereof on the body and supporting at a distal end thereof the knuckle, a torsion bar spring having one end adapted to be fixed to the body and a twistable and flexible distal end and adapted to extend in the fore-and-aft direction of the motor vehicle, and a resilient lower arm having one end fixed to the distal end of the torsion bar spring and the other end fastened to the distal end of the radius arm. The lower arm is flexible in the fore-and-aft direction of the motor vehicle and rigid in the vertical direction thereof.

SUSPENSION FOR MOTOR VEHICLES

BACKGROUND OF THE INVENTION

1. Field of the Invention

The present invention relates to a suspension for use in motor vehicles, and more particularly to an improvement in a suspension of the McPherson type.

2. Prior Art

Suspensions of the McPherson type include a shock absorber serving as part of a suspension linkage system and a radius arm pivotably mounted on a vehicle body and supporting thereon a steering knuckle on which a wheel is rotatably supported, the shock absorber being interposed between the knuckle and the vehicle body. The radius arm is also connected to a lower arm which is connected to the vehicle body, the radius arm and the lower arm being mounted on the vehicle body through rubber bushings.

There has been known a torsion bar used as a spring means in the suspension of the above described McPherson type and acting on the lower arm. The conventional lower arm is rigid in fore-and-aft and vertical directions and hence causes the torsion bar to be subjected at its connecting end to a bending moment when the torsion bar moves to follow the lower arm, with the result that the connecting end of the torsion bar will be fatigued.

Another suspension of the McPherson type which has found usage includes a strut-type damper serving as part of a suspension linkage. The damper generally comprises in combination a hydraulic damping force generator and a coil spring, and is connected between the vehicle body and the knuckle which is supported on the vehicle body and supports the wheel. Generally, the damper has its lower end located above the axis of an axle. Where the damper has a relatively long effective stroke, it has a length which causes to an increased height of the vehicle body. With the damper located at a front wheel, the engine cover lies at a relatively high level, and with the damper located at a rear wheel, a portion housing an upper end of the damper projects upwardly into a rear body portion or trunk area.

Such an arrangement, therefore, fails to meet a demand to reduce the height of the vehicle body at the engine cover from an aerodynamic standpoint, so as to lessen the resistance of the vehicle body to air flow for improving driving performance and fuel economy. Such requirement could be met by lowering the lower end of the damper. However, where the front wheels are driven by a transverse drive shaft coupled to the front wheel axles, such an attempt would cause the lower end of the damper to interfere with the drive shaft, and hence the damper could not be lowered in position on front-wheel drive automobiles. Furthermore, with the damper lowered, the coil spring which is disposed in surrounding relation to the upper end of the damper would be positioned too closely to the associated wheel, and the clearance therebetween would become smaller than required.

The present invention effectively overcomes the foregoing problems attendant known automotive suspension systems.

SUMMARY OF THE INVENTION

According to the present invention, there is provided a suspension system for a motor vehicle having a body, the suspensions system including at least a pair of sus- It is an object of the present invention to provide a suspension for motor vehicles which is allowed to move in the fore-and-aft direction of the motor vehicle in response to movements of a wheel with which the suspension is associated, while permitting a torsion bar to function effectively.

Another object of the present invention is to provide such a suspension which is relatively simple in construction.

The above and other objects, features and advantages of the present invention will become more apparent from the following detailed description when read in conjunction with the accompanying drawings in which certain preferred embodiments are shown by way of illustrative example.

DETAILED DESCRIPTION OF THE PREFERRED EMBODIMENTS

Figure 1:
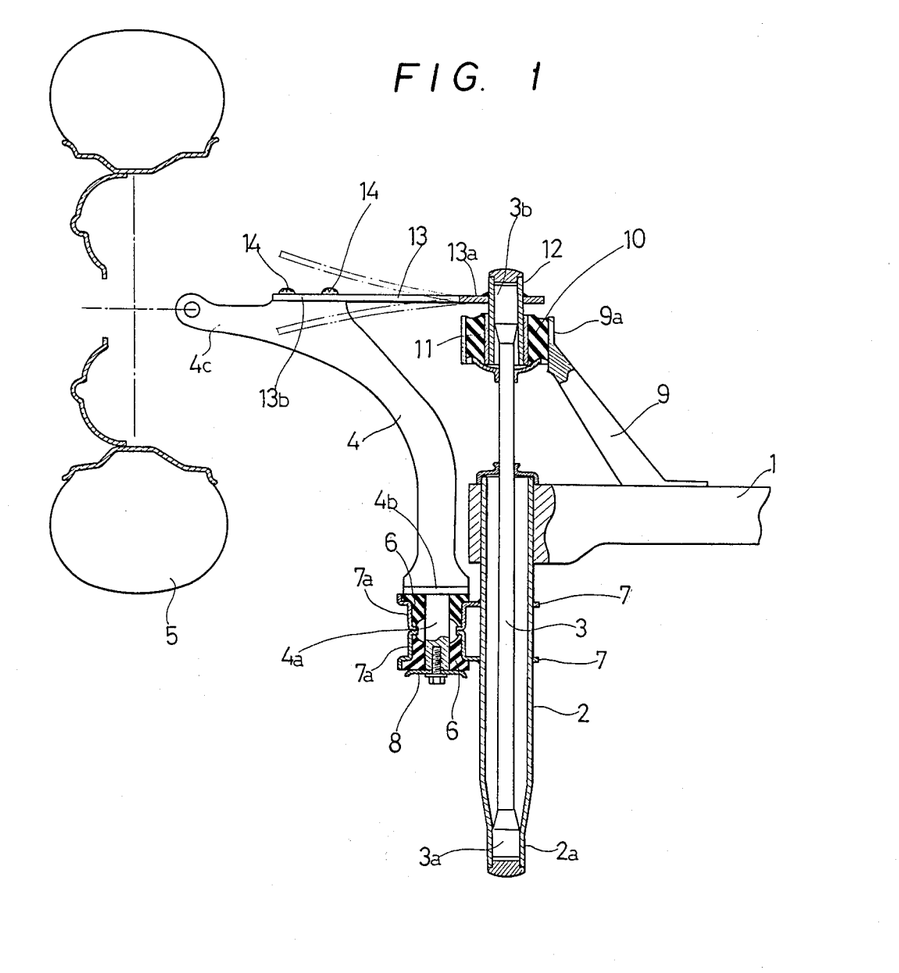
FIG. 1 is a plan view, partly in cross section, of a suspension for a motor vehicle according to a first embodiment of the present invention.

FIG. 1 shows a suspension for a motor vehicle according to a first embodiment of the invention, in which the direction of forward movement of the vehicle is upward of the figure.

The motor vehicle has a suspension crossmember 1 disposed in a front portion of a vehicle body. A rigid torsion bar support cylinder or sleeve 2 extends through one end of the suspension crossmember 1 in the fore-and-aft direction of the motor vehicle and has a front end thereof secured to the end of the crossmember 1. A torsion bar spring 3 extends with a clearance through the support cylinder 2 in the fore-and-aft direction and has a rear end 3a thereof fixed to the support cylinder 2 at a rear end 2a thereof. The torsion bar 3 is sufficiently longer than the support cylinder 2 so that the torsion bar 3 has an intermediate or front portion substantially projecting forwardly of a front end of the support cylinder 2.

A rigid radius arm 4 supports a wheel 5 through a knuckle (not shown), the radius arm 4 being substantially of an inverted L-shape when viewed from above. The radius arm 4 has on a rear end thereof a small-diameter support rod 4a over which there is fitted a pair of annular rubber bushings 6, 6 which are supported by a pair of brackets 7, 7, respectively, having symmetrical recessed seats 7a, 7a in which the rubber bushings 6, 6 are mounted, respectively. The rubber bushings 6, 6 are sandwiched between a flange 4b at a proximal end of the support rod 4a and a retainer 8 on a distal end of the support rod 4a in the axial direction of the latter or in the fore-and-aft direction of the motor vehicle. The brackets 7, 7 are secured at ends thereof to the support cylinder 2. The rear end of the radius arm 4 is thus supported on the vehicle body through the rubber bushings 6, 6 which will absorb fore-and-aft wobbling movements and vertical angular movements of the radius arm 4.

A support stay 9 is attached to and extends obliquely forwardly from the crossmember 1. The support stay 9 has in its distal end a through hole 9a opening in the fore-and-aft direction and retaining therein a rubber bushing 10 joined around its outer periphery to the inner wall of the hole 9a such as by burning, there being a collar 11 disposed on the rubber bushing 10 and joined thereto such as by burning them together. A support sleeve 12 is press-fitted in the collar 11 and receives therein a front end portion of the torsion bar 3. The torsion bar 3 has a front end 3b thereof fixed to an intermediate or front end portion of the support sleeve 12 with serrations or teeth defined therebetween.

To the front end of the support sleeve 12 there is integrally attached an end 13a of a lower arm 13 in the form of a resilient leaf spring which is resiliently flexible in the fore-and-aft direction of the vehicle and rigid in the vertical direction, the end 13a being inwardly widthwise of the motor vehicle. The lower arm 13 has an outer end 13b fastened by screws 14, 14 to a front edge of an outwardly extending front member 4c of the radius arm 4.

In operation, the radius arm 4 is subjected to reactive forces from the wheel 5 travelling on a road, and vertical shocks or movements of the radius arm 4 are dampened by a shock absorber (not shown). Such vertical movements of the radius arm 4 act as angular movements about the support rod 4a, which are absorbed by the rubber bushings 6, 6. The angular movements of the radius arm 4 are also transmitted through the vertically rigid lower arm 13 to the support sleeve 12 which is caused to turn, and the torsion bar 3 coupled rigidly therewith is then caused to be twisted. The torsion bar 3 produces reactive forces which are transmitted through the lower arm 13 to the radius arm 4, whereupon the shock absorber is spring-biased to return to its initial condition.

The wheel 5 while travelling is also caused to move in the fore-and-aft direction when it hits recesses and bumps on the road. Such movements of the wheel 5 are transmitted to the radius arm 4 to enable the lower arm 13 to flex resiliently in the same direction. Thus, the radius arm 4 and the lower arm 13 are permitted to smoothly follow the fore-and-aft movements of the wheel 5, whereupon the torsion bar 3 is not subjected to forces or torques tending to twist the torsion bar 3. The suspension as thus constructed has an increased capability to move in response to fore-and-aft movements of the wheel 5.

Figure 2:
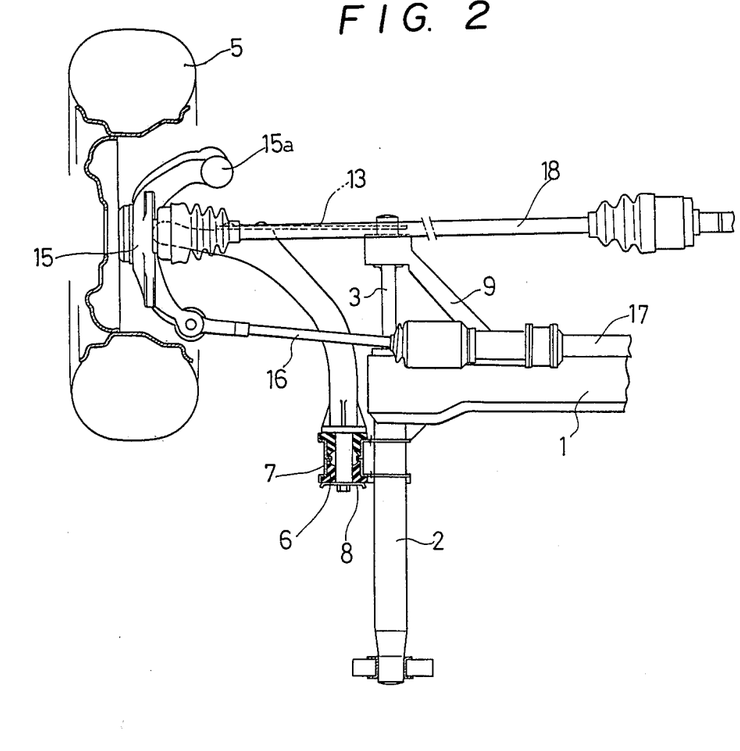
FIG. 2 is a plan view of the suspension of FIG. 1 as incorporated in a front-wheel drive automobile.

FIG. 2 illustrates the suspension of FIG. 1 as incorporated in a front-wheel drive car. Like or identical parts are denoted by like or identical reference characters in FIGS. 1 and 2, and description thereof will not be repeated.

The wheel 5 is supported on a knuckle 15 which is substantially C-shaped when viewed from above and has a rear end thereof coupled to a tie rod 16 which can be moved laterally of the vehicle by a steering gear box 17, causing the knuckle 15 to move angularly about a shaft (not shown) to steer the wheel 5. The knuckle 15 has on its front end a shock absorber support 15a to which there is connected a shock absorber coupled to the vehicle body. The shock absorber is thus displaced off center forwardly of the knuckle 15. A drive shaft 18 is connected to the wheel 5 and extends substantially parallel to the lower arm 13. With the shock absorber being offset in the forward direction, it is spaced apart from the drive shaft 18, reducing or eliminating limitations which would otherwise be imposed on the layout, design and structure of the motor vehicle due to a close arrangement of the drive shaft 18 and the shock absorber.

Figures 3, 4, 5:
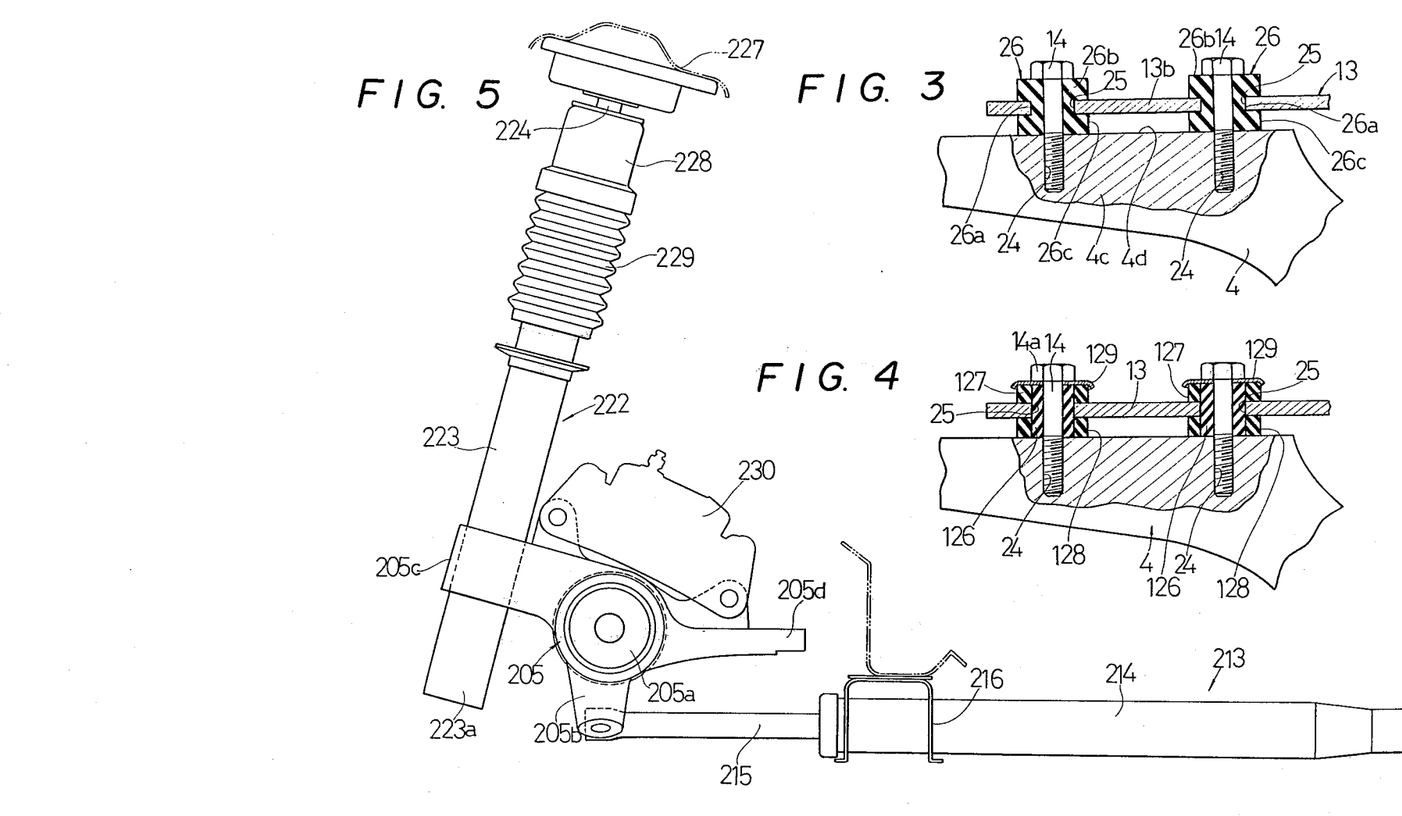
FIG. 3 is an enlarged fragmentary cross-sectional view showing a modification of the suspension illustrated in FIG. 1.
FIG. 4 is a view similar to FIG. 3, showing a further modification.
FIG. 5 is a side elevational view of a suspension for a motor vehicle according to a second embodiment of the invention.

The distal end 13b of the lower arm 13 and the front member 4c of the radius arm 4 according to the first embodiment may be coupled together as shown in FIG. 3. More specifically, the radius arm 4 has in its front surface 4d a plurality (two in the illustrated embodiment) of threaded holes 24, 24 opening in the forward direction. The lower arm 13 has in its distal end portion 13b attachment holes 25, 25 extending therethrough and larger in diameter than the threaded holes 24, 24. Bushings 26, 26 made of a vibration-isolating material such as rubber are mounted in the attachment holes 25, 25, respectively. Each of the bushings 26, 26 includes an intermediate portion 26a having a diameter which is equal to or slightly larger than that of the attachment hole 25, and a pair of flanges 26b, 26c each having a diameter sufficiently larger than that of the attachment hole 25. The bushings 26, 26 are mounted on the lower arm 13 such that the intermediate portions 26a, 26a are fitted respectively in the attachment holes 25, 25 with the lower arm portion 13b sandwiched between the flanges 26b, 26c. Screws 14, 14 extend through axial apertures in the bushings 26, 26 to be threadedly engaged in the threaded holes 24, 24, respectively, in the radius arm 4, thereby fastening the end portion 13b of the lower arm 13 to the front surface 4d of the radius arm 4 through the bushings 26, 26. The bushings 26, 26 may be provided in their axial apertures with collars as desired.

Vibrations of the wheel 5 and other parts of the running system while the vehicle is driving on the road will be transmitted to the radius arm 4 and the lower arm 13 connected thereto. With the vibration-isolating rubber bushings 26, 26 included in such a vibration transmitting system, vibrations of the radius arm 4 are absorbed by the bushings 26, 26 thus preventing the lower arm 13 from being vibrated. Therefore, vibrations as transmitted from the radius arm 4 to the vehicle body via the lower arm 13, the torsion bar spring 3, the support cylinder 2, and the crossmember 1 are blocked or suppressed by the bushings 26, 26, allowing the vehicle body to be less vibratable and giving passengers better riding comfort. Because only the rubber bushings 26, 26 are incorporated to reduce the vibrations, the suspension shown in FIG. 3 is simple in construction and requires a minimum number of additional parts to attain a desired vibration isolating capability.

FIG. 4 shows a further modification which includes harder rubber bushings. Identical or corresponding parts are denoted by identical or corresponding reference characters in FIGS. 3 and 4. Hollow cylindrical bushings 126, 126 are fitted respectively in the attachment holes 25, 25 in the lower arm 13, the bushings 126, 126 having an outside diameter which is substantially the same as the diameter of the attachment holes 25, 25. Annular bushings 127, 128 which are thinner than the bushings 126, 126 are fitted over each of the bushings 126, 126 on its portions projecting out of the attachment hole 25, the annular bushings 127, 128 having an inside diameter which is substantially the same as the outside diameter of the bushings 126, 126. The screws 14, 14 extend through axial apertures in the bushings 126, 126 into threaded engagement with the threaded holes 24, 24, respectively, in the radius arm 4 to fasten the lower arm 13 to the radius arm 4. Washers 129 are interposed between screw heads 14a and outer ends of the bushings 126, 127. With this arrangement, the rubber bushings are harder than those shown in FIG. 3, durable in operation, and can be attached with ease.

The vibration-isolating bushings shown in FIGS. 3 and 4 may be of any desired material other than rubber and may be shaped and constructed in other desired manners.

FIGS. 5 through 8 show a suspension according to a second embodiment of the present invention, the suspension being applied to a front-wheel drive automobile having dirigible front wheels.

Figure 6:
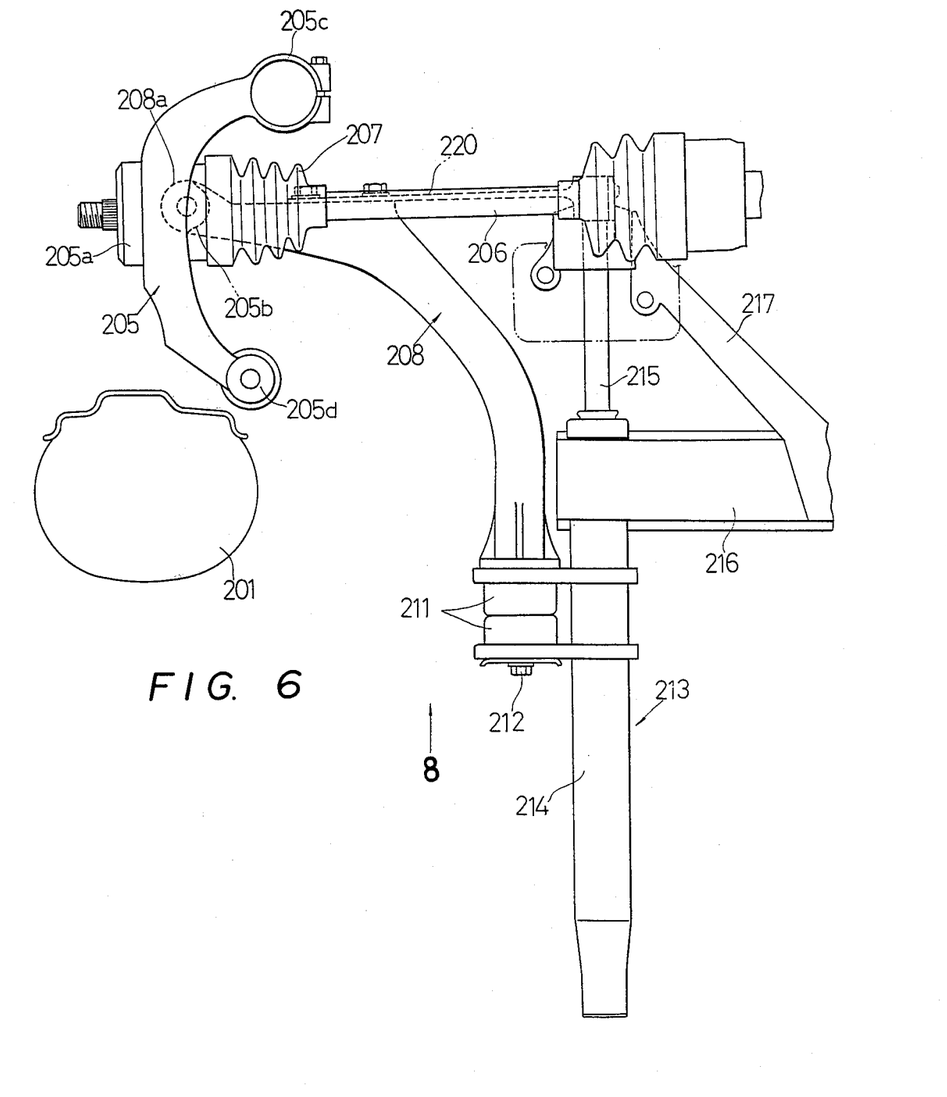
FIG. 6 is a plan view of the suspension illustrated in FIG. 5, showing parts to be associated with a wheel.
Figure 7:
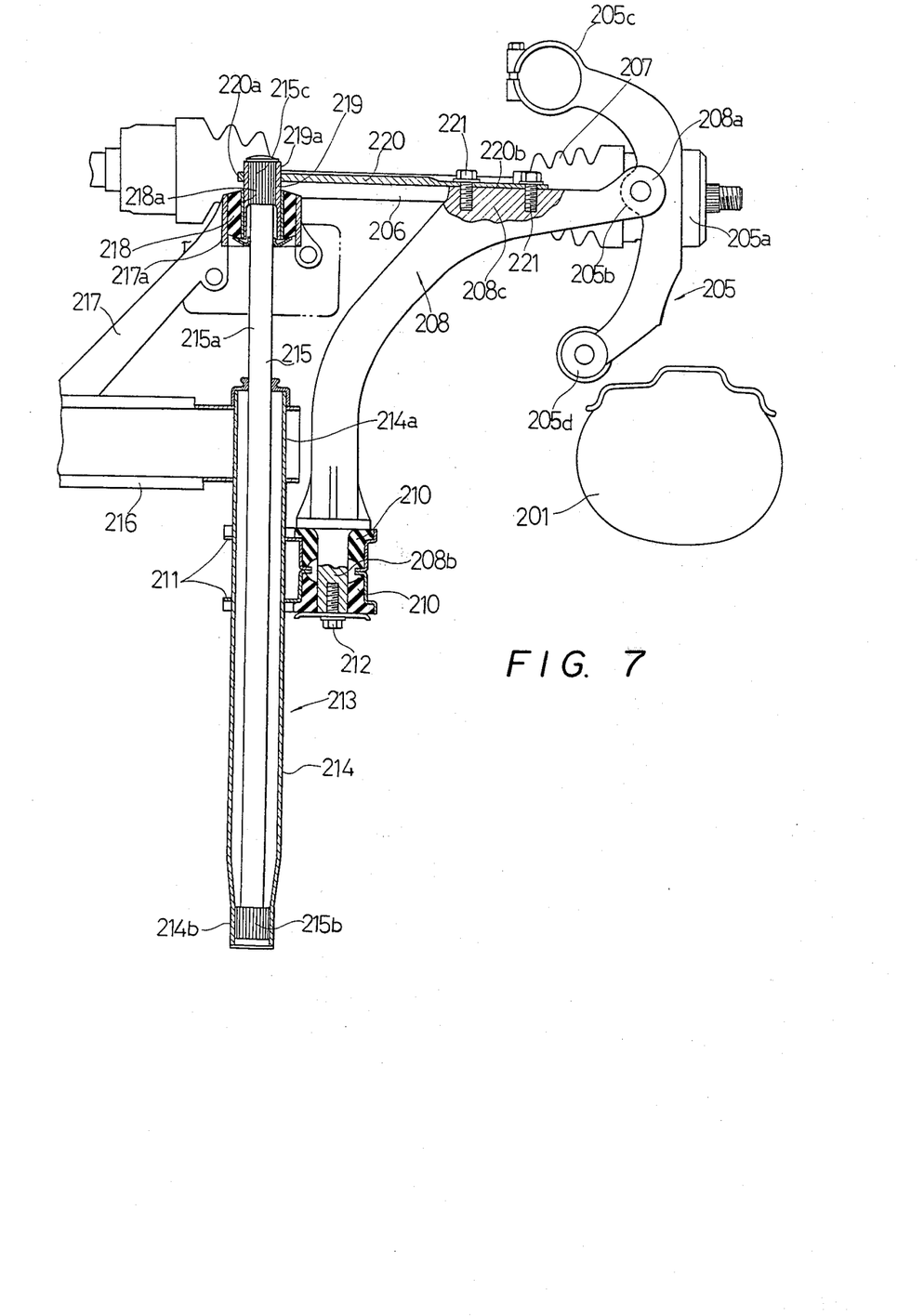
FIG. 7 is a plan view, partly in cross section, of the suspension shown in FIG. 6.
Figure 8:
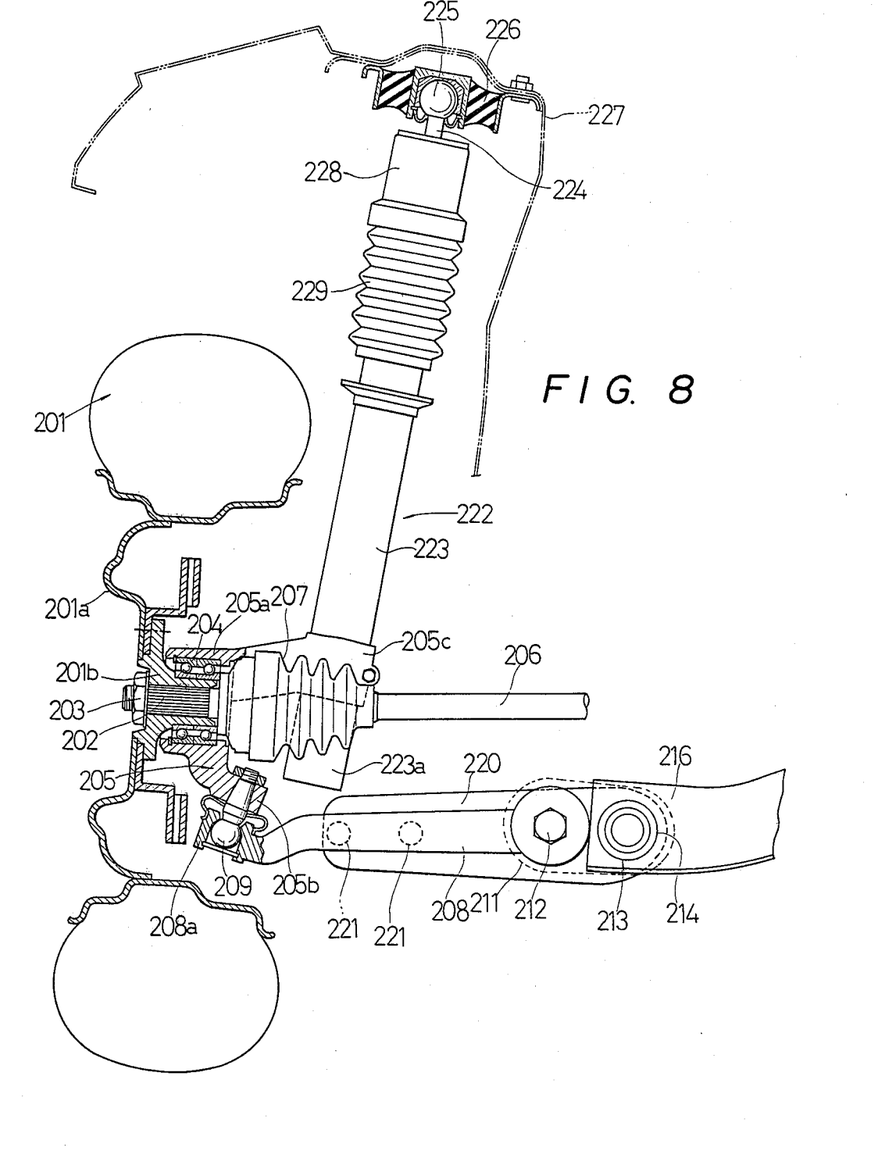
FIG. 8 is an elevational view taken in the direction of the arrow 8 of FIG. 6.

As shown in FIG. 8, a front wheel 201 has a disc 201a and a hub 201b which is fastened by a nut 203 to a drive axle 202, the hub 201b being rotatably journalled through a ball bearing 204 in an axle support 205a of a knuckle 205. The axle 202 is coupled via a universal joint 207 such as a constant-velocity joint or a cross joint to a drive shaft 206 which is connected to an engine (not shown). The knuckle 205 is substantially C-shaped as shown in FIGS. 6 and 7 and pivotably connected to a distal end 208a of a substantially L-shaped radius arm 208 through a ball joint 209 on a lower extension 205b of the axle support 205a of the knuckle 205.

As illustrated in FIG. 7, the radius arm 208 has a small-diameter rod 208b extending in the rearward direction and fastened to brackets 211, 211 by a screw 212 with rubber bushings 210, 210 interposed therebetween.

The brackets 211, 211 are mounted on a torsion pipe 214 which serves as a torsion spring 213 extending in the fore-and-aft direction of a motor vehicle body. The torsion pipe 214 has a front end 214a thereof fixed to an end of a suspension crossmember 216. A torsion bar 215 extends axially through the torsion pipe 214, and has front end portion 215a thereof projecting forwardly out of the torsion pipe 214 and a substantial portion thereof inserted with clearance in the torsion pipe 214. The torsion bar 215 has a serrated or toothed rear coupling end 215b which is fixed to a rear end 214b of the torsion pipe 214 for corotation. The front end portion 215a of the torsion bar 215 has a distal end 215c inserted in and secured such as by splines to a bushing 219 fitted in an inner collar 218a of a rubber bushing 218 mounted in a distal end 217a of a support arm 217 attached to the crossmember 216.

The bushing 219 has a portion 219a projecting out of the rubber bushing 218 and to which there is connected one end 220a of a lateral lower arm 220 in the form of a leaf spring, which has a distal end 220b thereof fastened by screws 221, 221 to a lateral front member 208c of the substantially L-shaped radius arm 208.

The substantially C-shaped knuckle 205 has a damper support 205c extending forwardly of the axle support 205a and curved inwardly widthwise of the vehicle as shown in FIGS. 6 and 7. The damper support 205c as thus shaped is positioned out of interference with the universal joint 207 and other parts when the knuckle 205 is angularly moved about the ball joint 209 during steering operation. A damper 222 in the form of a hydraulic shock absorber has a cylindrical casing 223 attached at a lower end portion thereof to the damper support 205c. The casing 223 has a lower end 223a thereof disposed downwardly of a horizontal plane in which the axle 202 lies. Thus, the lower end 223a of the casing 223 is offset forwardly of the axle 202 with an upper portion of the casing 223 inclined rearwardly as shown in FIG. 5. A substantial portion of the casing 223 is disposed so as to be inclined forwardly of a vertical plane in which the axle 202 lies.

As illustrated in FIG. 8, the damper 222 includes a rod 224 projecting upwardly of the cylindrical casing 223 and connected to a vehicle body 227 through a ball joint 225 and a rubber bushing 226. The rod 224 is surrounded by a rubber boot 229 extending between a skirt member 228 on an upper portion of the damper 222 and an upper end of the casing 223. The ball joint 225 which is disposed in alignment with the axis of the cylindrical casing 223 is located close to a vertical plane in which the axis of the axle 202 lies. Thus, the damper 222 has its upper end portion disposed upwardly substantially in the vertical plane of the axle 202 and extends downwardly and forwardly so that the damper 222 will stay out of interference with the radius arm 208, the lower arm 220, and driving system parts such as the drive shaft 206 and the universal joint 207 when the knuckle 205 angularly moves under any steering conditions. The axle support 205a of the knuckle 205 has a rearward extension 205d (FIG. 5) to which a steering tie rod (not shown) is operatively connected.

The damper 222 as thus displaced forwardly off the axle 202 out of interference with the driving system components is allowed to have a desired effective stroke and be positioned at a lowered location, an arrangement which permits the engine cover to lie at a reduced level. With the damper 222 inclined to have its lower portion location off the axle 202, the damper 222 can serve as a brace upon braking for producing an anti-diving effect which prevents the damper 202 from being forced downwardly.

Conventionally, a problem arises in attempting to lower the damper 222 in position since a coil spring interposed between the piston rod 224 and the cylindrical casing 223 would interfere with the wheel 201. However, the torsion spring 213 of the present invention eliminates such a difficulty. More specifically, when the knuckle 205 moves up and down while the wheel 201 travels on the road, the torsion bar 215 is twisted by the radius arm 208 and the lower arm 220, causing the torsion pipe 214 to be twisted through the coupling ends 214b, 215b. The torsion bar 215 and the torsion pipe 214 resiliently spring back to force the knuckle 205 to return upwardly or downwardly. During such time, the damper 222 is caused to be resiliently compressed or expanded under reactive forces applied by the torsion bar 215 and the torsion pipe 214 through the knuckle 205. Accordingly, no spring is required on the damper 222, thereby avoiding interference with the wheel 201 even with the damper 222 offset forwardly and located at a lowered position.

The damper 222 may however be provided with a known coil spring which can be of a small capacity because of combined use with the torsion spring 213. Such a coil spring therefore can be smaller in diameter and axial dimension or length than conventional springs, a structure which avoids interference with the wheel 201.

Because the lower arm 220 in the form of a leaf spring is resiliently flexible in the fore-and-aft direction and rigid in the vertical direction, fore-and-aft movements of the wheel 201 as it hits holes and bumps in the road are first transmitted to the radius arm 208 while the lower arm 220 resiliently flexes in that direction. Therefore, the radius arm 208 and the lower arm 220 can move smoothly to follow fore-and-aft movements of the wheel 201. The suspension thus has an increased capability to follow movements of the wheel 201 in the fore-and-aft direction. Loads generated in such fore-and-aft movement of the suspension which acts as a torque on the torsion bar 215 will be reduced as far as possible due to the flexing of the lower arm 220. The torsion bar 215 is twisted only when the vertically rigid lower arm 220 moves up and down.

Designated in FIG. 5 at 230 is a brake caliper of a wheel braking mechanism mounted on the axle support 205a of the knuckle 205.

Figure 9:
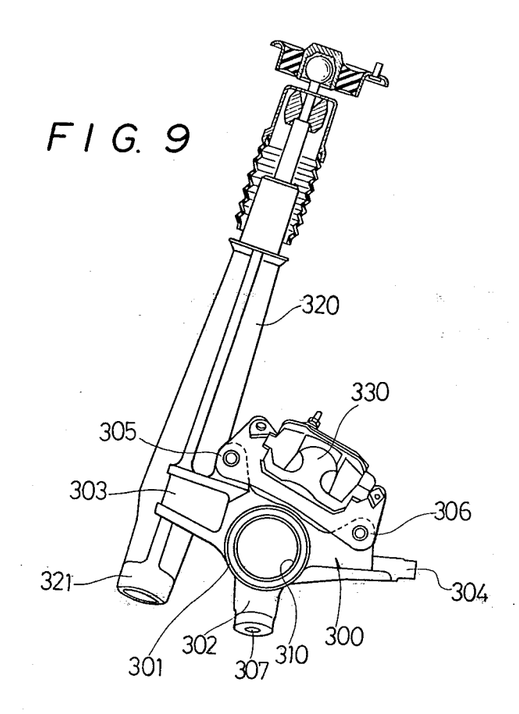
FIGS. 9 through 11 are views showing a motor vehicle suspension according to a third embodiment of the invention.
Figure 10:
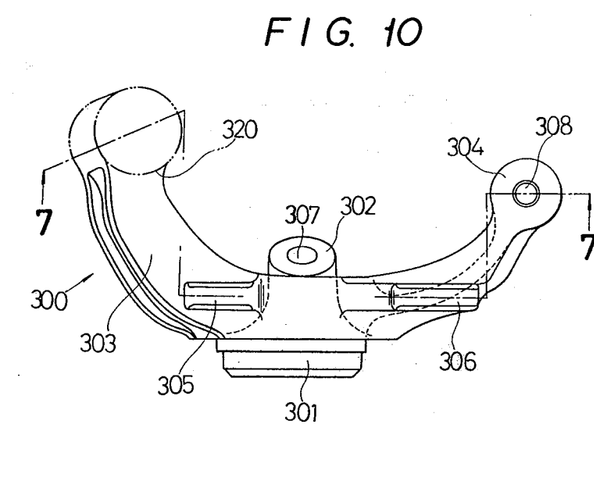
Figure 11:
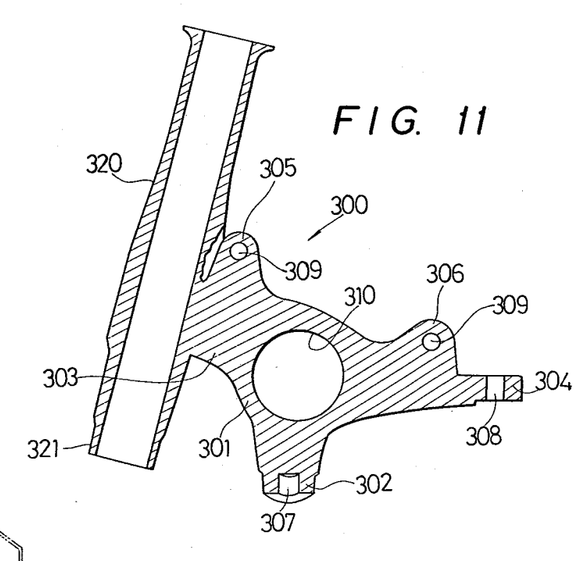

According to a third embodiment of the invention illustrated in FIGS. 9 through 11, a knuckle and a cylindrical damper casing are integrally formed such as by casting. In FIG. 9, a knuckle 300 comprises an axle support 301, a radius arm attachment 302, and a tie rod attachment 304, the axle support 301 having a damper support 303 extending forwardly thereof. A cylindrical damper casing 320 is formed such as by casting integrally with the damper support 303 and has a lower end portion 321 thereof displaced forwardly and downwardly off the axle support 301. As illustrated in FIG. 11, the knuckle components 301–304 and the cylindrical casing 320 are formed integrally of the same material. The knuckle 300 has a pair of bosses 305, 306 located upwardly of the axle support 301 and positioned forward and rearwardly thereof for supporting a brake caliper 330 (FIG. 9). The radius arm attachment 302, the tie rod attachment 304, and the brake caliper attachment bosses 305, 306 have attachment holes 307, 308, 309, respectively. The axle support 301 has an axle bore 310 for rotatably supporting a hub through a bearing, the hub being fitted over an axle.

With the above unitary construction, attachment brackkets, bolts and nuts are not required and which would otherwise be needed to interconnect a cylindrical damper casing and a knuckle which are separate from each other, and the number of parts required is reduced. The damper integral with the knuckle can be readily desirably located with respect to the knuckle, so that the damper is free from any positional errors which would otherwise be caused by backlashes of attachment bolts and nuts relative to brackets and attachment holes therein. The knuckle and the cylindrical damper casing can be integrally cast of light metal alloys such as an aluminum alloy for a reduced weight and a small size, in which case more design alternatives are available for the purpose of layout.

While the suspensions according to the foregoing embodiments of the invention have been described as being incorporated in front-wheel drive automobiles, they may also be used on rear-wheel drive and four-wheel-drive automobiles. Where the suspensions of the invention are associated with rear wheels, portions that house the dampers project into a passenger compartment or cargo trunk to a lesser degree, increasing a space available for use.

Figure 12:
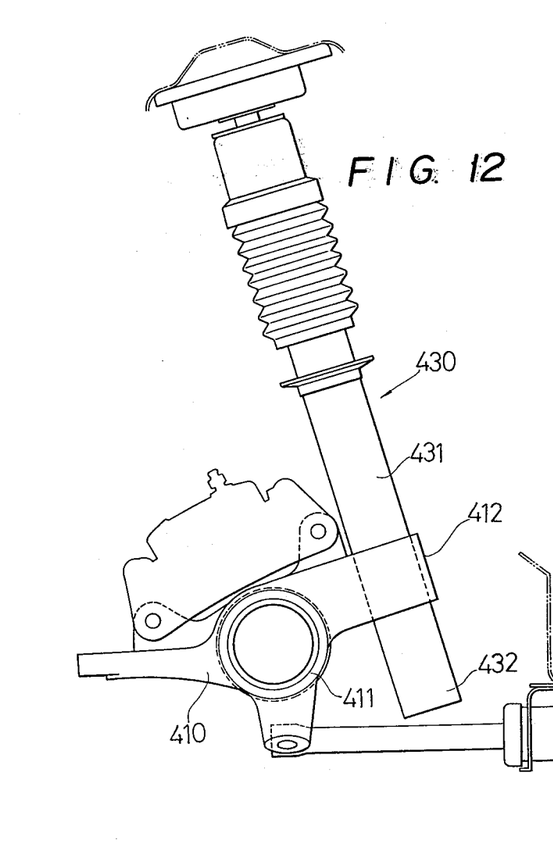
FIG. 12 is a side elevational view of a motor vehicle suspension according to a fourth embodiment of the invention.

FIG. 12 illustrates a fourth embodiment of the invention in which a damper 430 has an upper pivot end thereof disposed adjacent to a vertical plane in which an axle lies, with the remainder of the damper 420 being inclined downwardly rearwardly so as to be displaced rearwardly off the axle. A knuckle 410 has an axle support 411 and a damper support 412 extending rearwardly therefrom and supporting damper 430 which has a lower end 432 thereof disposed downwardly of a horizontal plane in which the axle lies. The damper 430 is thus offset rearwardly of the axle, resulting in the advantages as described above. The driving system is substantially of the same construction as that of the prior embodiments with only slight modifications. For this reason, only the knuckle, damper, and torsion spring 420 are illustrated in FIG. 12. With the embodiment of FIG. 12, the damper is positioned so as to be out of interference with the radius arm, the lower arm, and the drive shaft while the knuckle is turned in steering operation. The damper 430 as inclined and displaced rearwardly off the axle can enjoy the same advantages accruing from the dampers as inclined and displaced forwardly of the axle.

Although in the foregoing embodiments the lower ends of the dampers have been shown as being located below the horizontal plane of the axle, they may also be positioned in or slightly above such horizontal plane.

FIGS. 13 through 16 illustrate a suspension system according to a fifth embodiment of the present invention. A suspension crossmember 501 which extends transversely of a vehicle body at a front portion thereof supports on ends thereof torsion springs 502, 512 spaced from each other widthwise of the vehicle body and extending in the fore-and-aft direction of the vehicle body. The torsion springs 502, 512 respectively comprise torsion pipes 503, 513 joined at their front ends to the ends of the crossmember 501 and extending in the fore-and-aft direction, and torsion bars 504, 514 extending with clearance axially through the torsion pipes 503, 513, respectively. The torsion bars 504, 514 have respective rear ends 504a, 514a thereof coupled through serrations or teeth to inner peripheral walls of rear ends 503a, 513a of the torsion pipes 503, 513, respectively, for corotation. The torsion bars 504, 514 also have respective front end portions projecting forwardly out of front ends 503b, 513b of the torsion bars 503, 513, and respective front ends 504b, 514b to which there are joined through serrations ends of lower arms 505, 515 extending outwardly away from each other in the transverse direction of the vehicle body. The lower arms 505, 515 have outer ends, respectively, which are operatively coupled to wheels 506, 516. Wheel support members such as knuckles, radius arms, shock absorbers and others the like are omitted from illustration for the sake of brevity.

Figure 13:
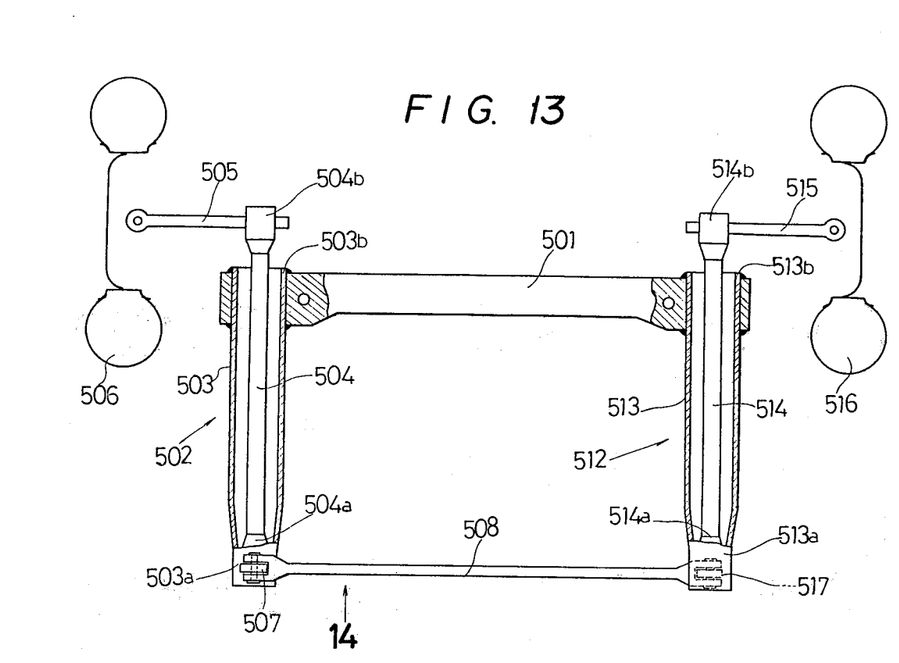
FIG. 13 is a plan view, with parts in cross section, of a suspension system according to a fifth embodiment of the present invention.

The wheels 506, 516 are spring-biased or subjected to spring forces when the torsion bars 504, 514 coupled thereto through the lower arms 505, 515, respectively, are twisted and the torsion pipes 503, 513 joined to the torsion bars 504, 514 are twisted, with the overall spring rate being a combination of the spring rate of the torsion bars 504, 514 and that of the torsion pipes 503, 513.

Figure 14:
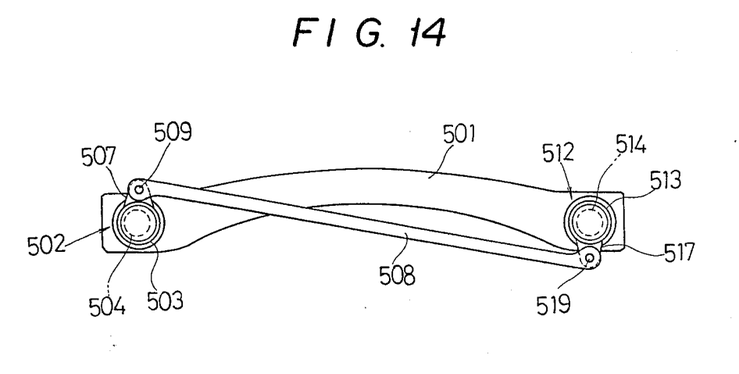
FIG. 14 is an elevational view taken in the direction of the arrow 14 of FIG. 13.

One of the torsion pipes 503 has on its rear end a bracket 507 projecting upwardly, and the other torsion pipe 513 has on its rear end a bracket 517 projecting downwardly. The brackets 507, 517 are operatively interconnected by a connecting rod 508 having one end thereof pivotably coupled by a pin 509 to the bracket 507 and the other end thereof pivotably coupled by a pin 519 to the bracket 517. With the brackets 507, 517 directed upwardly and downwardly, respectively, the connecting rod 508 is positioned above the torsion pipe 503 at one end and below the torsion pipe 513 at the other end, so that the connecting rod 508 is inclined as connected between the torsion bars 503, 513, as shown in FIG. 14.

Figure 15:
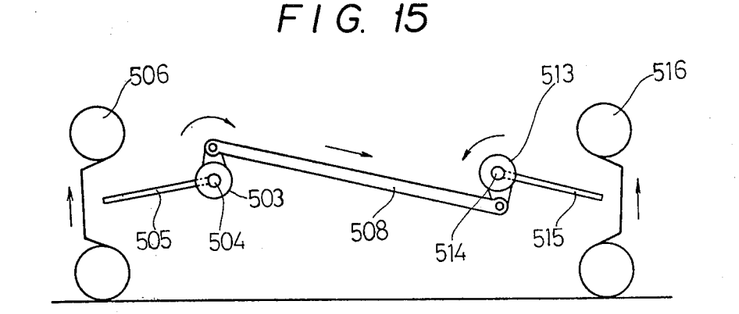
FIGS. 15 and 16 are views showing the manner in which the suspension of FIG. 13 operates.

When the wheels 506, 516 travel over bumps in the road and move upwardly as illustrated in FIG. 15, the lower arm 505 is angularly moved upwardly to cause the torsion bar 504 to twist the torsion pipe 503 clockwise, thus pushing the connecting rod 508 axially in the direction of the arrow. At the same time, the lower arm 515 is turned upwardly to twist the torsion pipe 513 counterclockwise through the torsion bar 514, thereby pulling the connecting rod 508 axially in the direction of the arrow. Therefore, the connecting rod 508 is forced to move axially in one direction under combined forces from the torsion pipes 503, 513.

Figure 16:
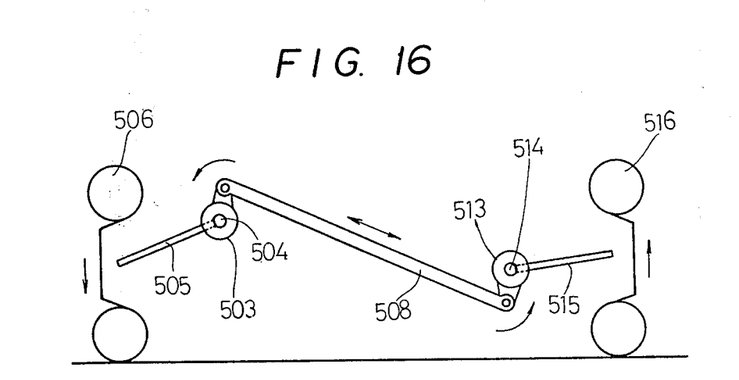

While the vehicle is in circular motion such as when it turns around a corner, the shock absorber associated with one of the wheels is on the bump side and the shock absorber associated with the other wheel is on the rebound side. For example, as shown in FIG. 16, when the wheel 516 is on the bump side, the lower arm 515 causes the torsion bar 514 and the torsion pipe 513 to be twisted in the counterclockwise direction, whereupon the connecting rod 508 is pulled to the right. When the wheel 506 is on the rebound side, the lower arm 505 forces the torsion bar 504 and the torsion pipe 503 to be twisted counterclockwise, thus pulling the connecting rod 508 to the left. Therefore, the connecting rod 508 is pulled axially in opposite directions, stabilizing the wheels 506, 516 against excessive vertical movements while the vehicle is in turning motion. Conversely, when the wheels 506, 516 are respectively on the bump and rebound sides as the vehicle is steered to turn, the connecting rod 508 is placed under axial compressive forces so that it can also act to stabilize the wheels.

While the connecting rod 508 has been shown as connected between points where the torsion bars 504, 514 are joined to the torsion pipes 503, 513, the connecting rod 508 may also be displaced forwardly of the rear ends of the torsion pipes 503, 513 and joined thereto at desired positions therealong in order to change the torsion spring characteristics and stabilizing capability. The connecting rod 508 may also be modified dependent on the combined spring rate of torsion springs used and the kind of vehicles on which the suspension system is installed.

Although certain preferred embodiments have been described and shown in detail, it will be understood that various changes and modifications may be made therein without departing from the scope of the appended claims.

What is claimed is:

1. A suspension system for a motor vehicle having a body, said suspension system including at least a pair of lateral suspensions each comprising:
    a shock absorber having an upper end thereof adapted to be mounted on said body of said motor vehicle;
    a knuckle operatively connected to said shock absorber for supporting a wheel thereon;
    a radius arm adapted to be mounted at one end thereof on said body and at a distal end thereof on said knuckle;
    a rubber bushing which is resilient in substantially the fore-and-aft direction of said motor vehicle, said rubber bushing supporting said one end of said radius arm on said body;
    a torsion bar spring having one end thereof adapted to be fixed to said body, and having a substantially twistable and flexible distal end, and being adapted to extend in substantially the fore-and-aft direction of said motor vehicle;
    a resilient lower arm having one end thereof fixed to said distal end of said torsion bar spring and the other end thereof fastened to said distal end of said radius arm, said lower arm being resiliently flexible in substantially the fore-and-aft direction of said motor vehicle and rigid in substantially the vertical direction thereof; and
    said lower arm comprising a leaf spring.

2. A suspension system according to claim 1, wherein: said shock absorber comprises a strut-type damper; said suspensions support axles adapted to be connected to a drive shaft of said motor vehicle; each of said dampers has a lower end disposed substantially adjacent to or below a horizontal plane in which said axle lies; and said lower end of said damper is displaced forwardly or rearwardly off said axle.

3. A suspension system according to claim 2, wherein each of said dampers is adapted to be pivotably mounted on said body at a point disposed substantially adjacent to a vertical plane in which said axle substantially lies.

4. A suspension system according to claim 1, wherein said shock absorber has a cylindrical casing formed integrally with said knuckle.

5. A suspension system according to claim 1, wherein: a connecting rod is provided so as to operatively interconnect said torsion bars of said suspensions; and said connecting rod is connected so that said torsion bars will be twisted in opposite directions, such that said connecting rod is forced to move in one axial direction under combined forces from said torsion bars when the wheels of said vehicle move upwardly, and said connecting rod is subjected to forces in opposite axial directions by said torsion bars, respectively, when said vehicle is in a turning motion.

6. A suspension system according to claim 5, wherein said connecting rod is connected to said torsion bars at rear ends thereof in substantially the fore-and-aft direction of the said motor vehicle.

7. A suspension system according to claim 5, wherein: said connecting rod is operatively interconnected to one of said torsion bars at a position above said one torsion bar, and is operatively interconnected to the other of said torsion bars at a position below said other torsion bar.

* * * * *